Oct. 21, 1969

C. W. LEWIS 3,473,863

VARIABLE TRANSMISSION WINDOWS

Filed April 12, 1966

INVENTOR
CHARLES W. LEWIS

BY
ATTORNEYS

Oct. 21, 1969     C. W. LEWIS     3,473,863
VARIABLE TRANSMISSION WINDOWS
Filed April 12, 1966     2 Sheets-Sheet 2
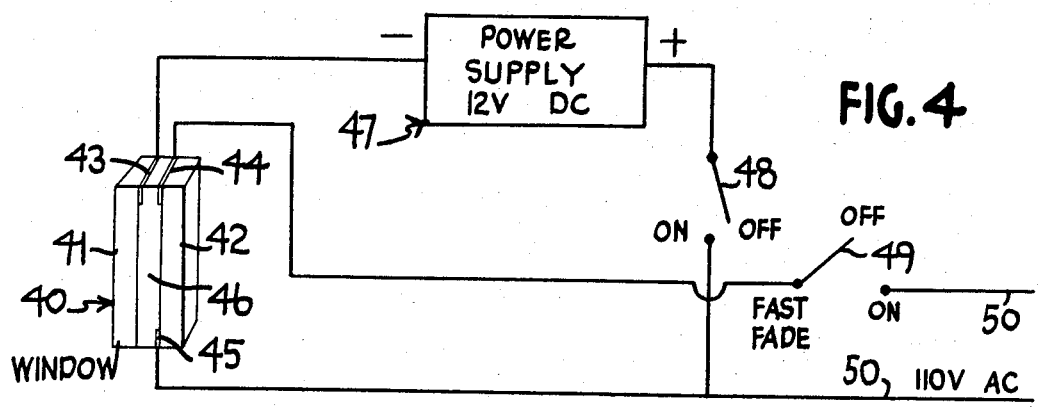
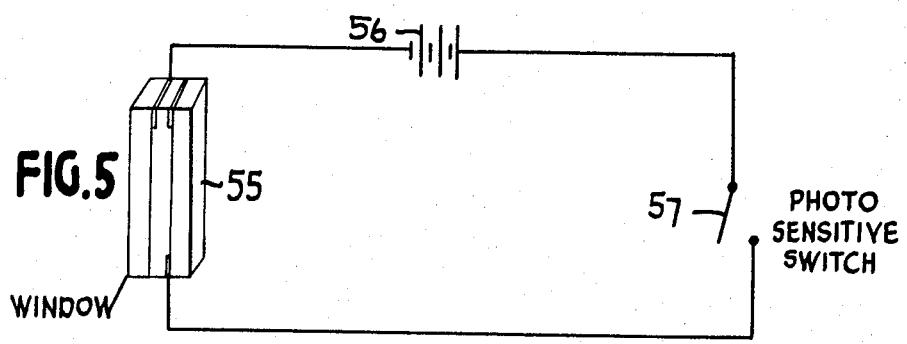
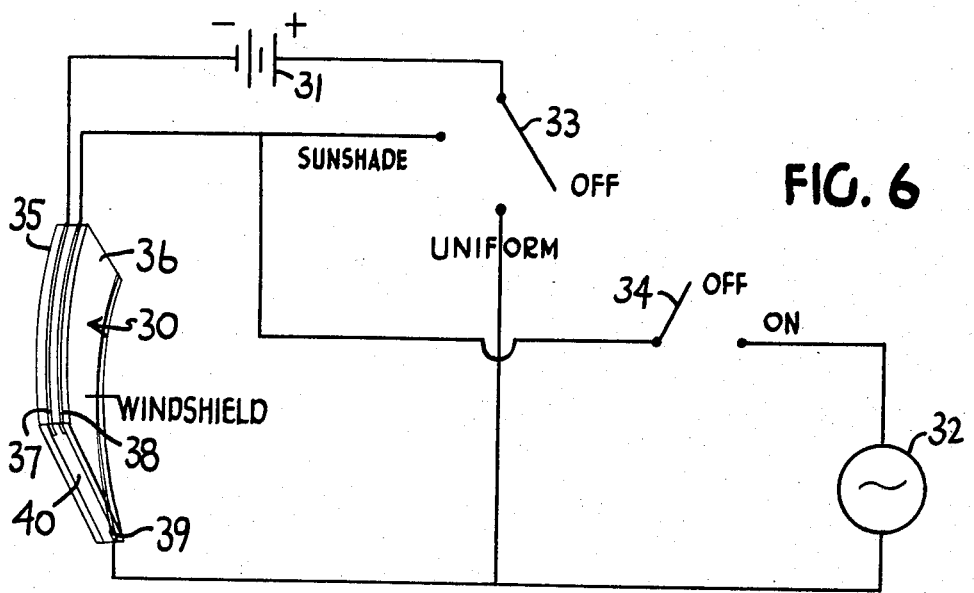
INVENTOR
CHARLES W. LEWIS
BY Chisholm and Spencer
ATTORNEYS

United States Patent Office 3,473,863
Patented Oct. 21, 1969

3,473,863
VARIABLE TRANSMISSION WINDOWS
Charles W. Lewis, Pittsburgh, Pa., assignor to PPG Industries, Inc., Pittsburgh, Pa., a corporation of Pennsylvania
Filed Apr. 12, 1966, Ser. No. 542,093
Int. Cl. G02f 1/28, 1/36; G02b 27/00
U.S. Cl. 350—160
6 Claims

ABSTRACT OF THE DISCLOSURE

The present invention relates to variable transmission windows. More particularly, the present invention relates to variable transmission windows comprising a laminated glass article of at least two sheets of glass, each with a transparent electroconductive coating on an interior surface, a plastic interlayer serving as an electrolyte, and containing soluble thallium or lead compounds whereby the percent light transmission may be regulated by applying an electric potential across said interlayer to deposit an oxide coating of lead or thallium on one of the electroconductive coatings.

---

Various mechanisms can be employed to manufacture a variable transmission window. Broadly, the mechanisms available can be divided into two general types. The principal characteristic of the first type is that the amount of light transmitted through the window is controlled automatically by the amount of light in a particular wave length band which strikes the window. The second type of variable transmission window controls the amount of light transmitted by means other than the amount of incident radiation.

U.S. Patent 3,208,860, issued to W. H. Armistead and Stanley D. Stookey Sept. 28, 1965, discloses an example of the first type of variable transmission window mechanism. The amount of light transmitted is controlled by the phototropic behavior of a family of silicate based glass compositions. The phototropic response (variable light transmittance) is attributed to crysttals of silver halide dispersed in the glass, which upon being irradiated with ultraviolet radiation, darken to reduce the transmission of the glass. When the exciting radiation is removed, the induced color of the silver halide crystals fades, to restore the original transparency of the glass.

Other phototropic glass compositions are also known, such as those disclosed in copending U.S. Patent applications Ser. No. 207,363, filed July 3, 1962, and Ser. No. 215,139, filed Aug. 6, 1962, by Alvin J. Cohen. The phototropic behavior of these glasses is due to the presence of europium or cerium ions in a strongly reduced silica glass matrix. Upon irradiation with ultraviolet radiation, the europium or cerium ions absorb a portion of the ultraviolet light, causing the release of an orbital electron which is then believed to be trapped in a metastable color center trapping site in the strongly reduced glass matrix to form a color center. The color center exhibits an absorption band centered at about 5750 angstroms, which provides the glass with a characteristic amethyst color. When the exciting ultraviolet radiation is removed, the color centers formed spontaneously decay to restore the original transparency of the glass.

While it is advantageous for certain purposes to have a variable transmission window which reacts automatically to the amount of incident radiation, this type of mechanism inherently possesses certain disadvantages. The phototropic glasses thus far developed all exhibit, to various degrees, temperature-dependent variable transmission characteristics. The higher the ambient temperature of the glass, the lower is the color saturation level which can be developed by a particular amount of incident radiation. At temperatures in excess of about 120° F., for example, these glass compositions develop very little, if any, noticeable phototropic darkening when irradiated by ultraviolet light.

The automatic variation in the transmission of a phototropic glass type of variable transmission window though convenient for certain applications can also be a disadvantage. It may be desirable, for example, to be able to vary the transmission of the window in the complete absence of incident ultraviolet radiation.

In addition to variable transmission windows incorporating phototropic glasses, various thermo-mechanical types of variable transmission windows have been devised. U.S. Patent 2,501,418, issued Mar. 21, 1950 to John W. Snowden, discloses a double glazed unit in which the narrow space between the sheets of the unit is filled with a liquid. The liquid is stored in a collecting chamber, and when heated expands to fill the space between the sheets similar to the rise of mercury in a thermometer. The transmission of the window varies because the liquid is selected to be opaque to visible light.

A thermotropic variable transmission window is also known, such as that disclosed in U.S. Patent 2,710,274, issued June 7, 1955 to Georg Walter Kuehl. This patent discloses a double glazed viewing medium consisting of two glass or synthetic resin sheets (Plexiglas) having a thermotropic interlayer material laminated therebetween. Some of the interlayer materials disclosed are various polymer compounds such as methyl polyvinyl ethers, polyglycol ethers, salts of polyacrylic acids and alkaline earth metals, polyvinyl alcohols which have been partly condensed with acetaldehyde to acetal compounds and various other organic materials.

Broadly, what has been discovered in the present invention is a type of electrochemical variable transmission window. More particularly, what has been discovered is a double glazed variable transmission window which consists of an interlayer material positioned between the sheets of the window, which contains a transparent material capable of forming an opaque precipitate by the application of an electrical potential. When the electrical potential applied to the window is turned off, the opaque precipitate redissolves in the interlayer material to restore the original transparency of the window.

More particularly, the present invention involves the electrolytic deposition of lead dioxide or thallium oxide from the interlayer material onto at least a portion of one major surface of the window. The mechanism used to deposit the metallic oxide precipitate is to pass direct electrical current through the interlayer material between electrically conductive coatings present on at least a portion of each of the glass sheets of the window. Lead present as Pb(II) ion or thallium present as Tl(II) ion in the interlayer material is oxidized by the electric current and deposits on one of the electroconductive coatings of one of the glass sheets. This precipitation or deposition of $PbO_2$ or $Tl_2O_3$ occurs on the electroconductive coating which corresponds to the anode of an electrolytic cell. The $PbO_2$ or $Tl_2O_3$ precipitated being strongly light absorbing decreases the amount of light transmitted by the double glazed window unit. When the current is turned off, the precipitated $PbO_2$ or $Tl_2O_3$ redissolves in the interlayer material to restore the original transparency of the window.

It should be noted that the present invention involves two different concepts of electrical conductivity. These two types of electrical conductivity are classified as electronic and ionic conductivities. For purposes of the present invention, electronic conductivity refers to the movement of electrons in a material as the electric current flow mechanism. The coatings in the present invention exhibit electronic conducting characteristics. Typical examples of the electronic type of conducting materials are the conductive metals such as silver and copper.

Ionic conduction refers to the type of electric current flow which occurs in an electrolytic cell. The electric current flow is accomplished by the migration of positive and negative ions in the material. In the present invention, the interlayer material is an ionic conducting type material.

The invention will be more readily understood by making reference to the following drawings, in which:

FIGURE 4 is an electrical circuit diagram suitable for controlling the transmission characteristics of an architectural double glazed unit;

FIGURE 5 is an electrical circuit diagram suitable for automating the control of the transmission characteristics;

and in which FIGURE 6 is an electrical circuit diagram suitable for controlling the transmission characteristics of a laminated windshield of an automobile.

The invention is more fully described in the following detailed examples. Example I is the preferred embodiment of the invention and constitutes the best mode contemplated by the inventor for practicing the teachings of his invention.

Example I

Two glass sheets 12 inches x 12 inches x ¼ of an inch thick were fabricated using standard melting and forming techniques. The calculated chemical composition of these glass sheets is presented below.

| Ingredient: | Percent by wt. |
| --- | --- |
| $SiO_2$ | 73.0 |
| $Na_2O$ | 13.2 |
| CaO | 8.5 |
| MgO | 3.5 |
| $Al_2O_3$ | 1.2 |
| $Na_2SO_4$ | 0.4 |
| NaCl | 0.1 |
| $Fe_2O_3$ | 0.1 |

Figure 1:
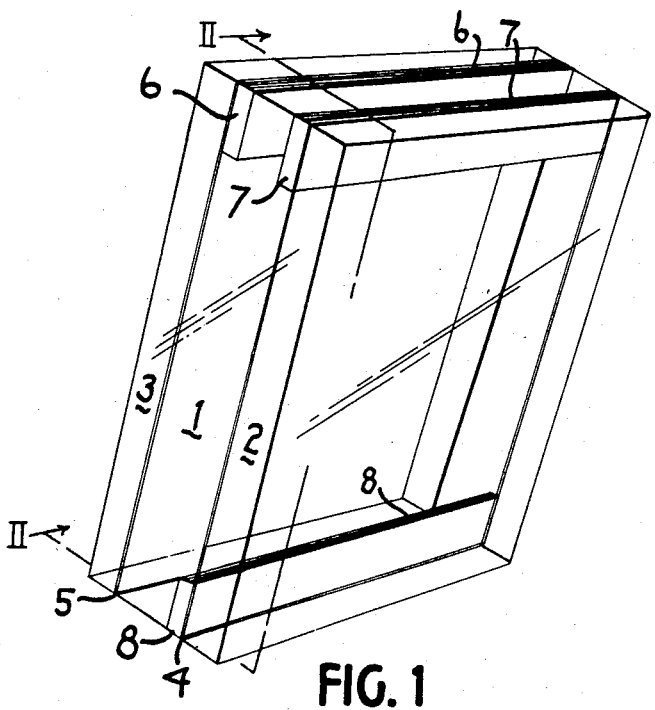
FIGURE 1 is a schematic drawing of a double glazed unit suitable for architectural glazing purposes.

Each glass sheet was then coated on one major surface with a thin film of tin oxide, using the techniques described in U.S. Patent 2,566,346. The tin oxide coated glass sheets were then laminated to form a double glazed unit having an interlayer material between the glass sheets as shown in FIGURE 1. The double glazed unit was fabricated so that the coated major surface of each glass sheet was placed in contact with the interlayer material. In FIGURE 1, the glass sheets are indicated as 2 and 3, respectively, and the interlayer material as 1. The electrically conducting coating on sheet 2 is indicated as 4 and the electrically conductive coating on sheet 3 as 5. A bus bar was provided for each of the electrically conducting coatings, and indicated as 6 and 7, respectively. An additional bus bar was provided for sheet 2 and indicated as 8. The bus bars were connected to an electrical circuit (not shown in FIGURE 1) which controls the electric current applied to the window unit.

Figure 2:
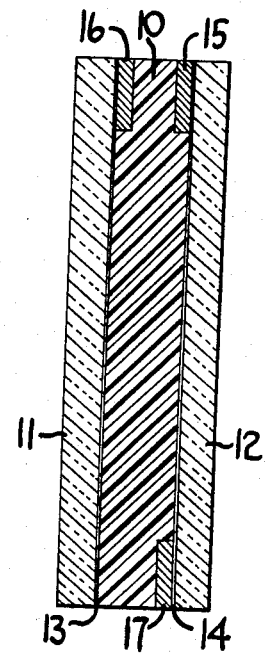
FIGURE 2 is a cross-section taken along line II—II of FIGURE 1.

FIGURE 2 is a cross-section taken along line II—II of FIGURE 1 indicating the various component parts of the window. In FIGURE 2, the glass sheets are indicated as 11 and 12 and the interlayer as 10. The electrically conductive coatings on the glass sheets 11 and 12 are indicated as 13 and 14, respectively. The bus bar connected to the electrical conductive coating 13 of sheet 11 is indicated as 16, and the bus bar connected to the electrical conducting coating 14 of sheet 12 is indicated as 15. An additional bus bar was provided for glass sheet 12 and is indicated as 17.

The preferred composition of the interlayer material in this example is presented below:

| Ingredient: | Parts by wt. |
| --- | --- |
| Polyethylene glycol (molecular weight 200) | 30.0 |
| Lead acetate | 20.0 |
| Polyvinyl butyral | 50.0 |
| Hydroquinone | 0.10 |

The interlayer material was prepared by placing 60 grams of polyethylene glycol, 40 grams of lead acetate trihydrate, ²/₁₀ of a gram of hydroquinone and 20 milliliters of ethanol in a beaker. These materials were then heated to a temperature between about 150° F. and 170° F. for about 15 minutes and stirred until they formed a homogeneous mixture. The mixture was then allowed to cool to a temperature of approximately 120° F., and then 100 grams of polyvinyl butyral and 300 milliliters of ethanol were added. The mixture was again stirred to blend the materials and then allowed to stand for 16 hours at room temperature. The ethanol was then removed from the interlayer composition by placing the beaker in an evacuation chamber and pulling a vacuum on the chamber of 6–8 millimeters of mercury for a period of 120 minutes at 70° F. The interlayer material was then placed between the tin oxide coatings of the glass sheets to form the double glazed window unit. Bus bars were attached to the tin oxide coatings and an electrical circuit assembled as indicated in FIGURE 4.

In FIGURE 4, the double glazed window unit is indicated as 40. The glass sheet provided with a single bus bar is indicated as 41, and the glass sheet provided with two bus bars is indicated as 42. The bus bars are indicated as 43, 44 and 45. The interlayer is indicated as 46. The direct current power supply is indicated as 47. This power supply may be a 12 volt battery or an electronic device comprising a transformer, a rectifier and a filter.

Two switches are provided in the circuit indicated as 48 and 49, and 50 indicates an alternating current 110 volt power supply.

The window is darkened by closing switch 48 and leaving switch 49 open. The direct current power supply used was a 12 volt battery.

A direct current of 12 volts was then passed through the interlayer material. Approximately 1 millamp per square inch of electrical coating was produced. The unit was observed to darken to approximately 50 percent of its original transparency in approximately 4 minutes. The power was then turned off by opening switch 48 and the unit faded to 90 percent of its original transparency in approximately 45 minutes. Switch 48 was again closed and the window darkened to approximately 50 percent of its original transparency in about 4 minutes. Switch 48 was then opened and switch 49 closed. Alternating 110 volt current was then applied to the electrically conductive coating on glass sheet 42, which tended to heat the window. The window unit was observed to fade to 90 percent of its original transparency in about 2 minutes.

Example II

Figure 3:
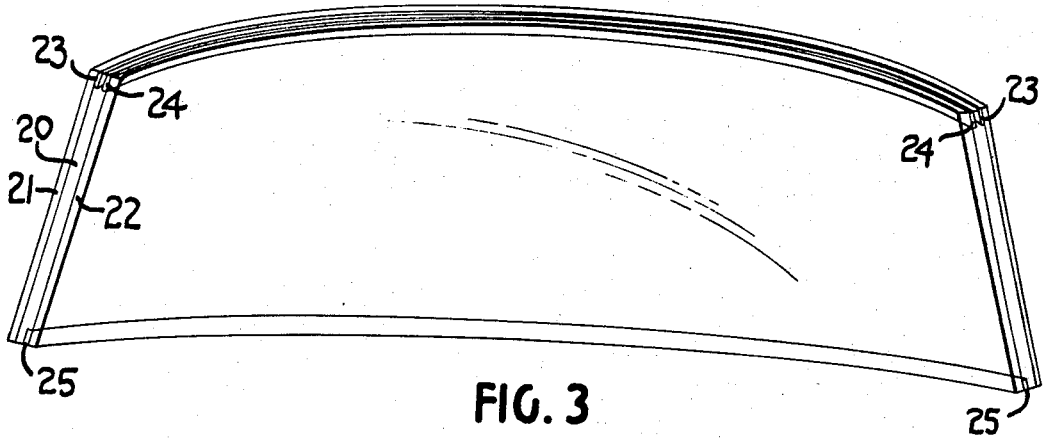
FIGURE 3 is a drawing of a double glazed laminated variable transmission window suitable for use as an automobile windshield.

FIGURE 3 is a drawing of a double glazed plastic reinforced laminated variable transmission window fabricated in accordance with the teachings of the present invention which is suitable for use as the windshield of an automobile. This particular variable transmission window design is capable of being uniformly darkened, of being darkened in only a localized band across the top (sunshade) and of being electrically defrostable and/or faded by passing electrical current through one of the electrically conductive tin oxide coatings to heat the windshield.

In FIGURE 3, 21 and 22 indicate the principal glass sheets of the double glazed windshield unit. The reinforcing variable transmission interlayer material is indicated as 20, and the bus bars connected to each of the electrically conducting tin oxide coatings on the inner surface of each of the glass sheets are indicated as 23, 24 and 25. The composition of the interlayer is the same as that employed in the window of Example I.

In FIGURE 6, an A.C.–D.C. combination power supply is shown which can be used to operate the windshield of the present example. In FIGURE 6, the windshield is indicated as 30, the D.C. power supply (car battery) as 31 and the A.C. power supply as 32. Two switches, indicated as 33 and 34, provide the several circuits required to operate the windshield.

To cause the windshield to darken uniformly, switch 33 is closed to the position indicated as uniform in FIGURE 6 and switch 34 is left open. The circuit thus created is from the D.C. power supply 31 (battery) to the bus bar 37 on sheet 35, across the interlayer 40 to bus bar 39 and back to the D.C. power supply.

The window darkens uniformly because the total resistance in the system is the same regardless of how far the current flows in the conductive coating of the first sheet before crossing through the interlayer to the other conductive coating and back to the power source. The portion of the resistance provided by the coating of the first sheet which is avoided by crossing the interlayer is provided by the coating on the other sheet.

To develop a sunshade, the windshield switch 33 is moved to the position indicated as sunshade in FIGURE 6, and switch 34 is left open. The circuit now created begins at the D.C. power supply (battery), flows to bus bar 37, then across the interlayer 40, to bus bar 38 and then back to the D.C. power supply 31. Because the path of least resistance is between the bus bars located on the top of the windshield, the $PbO_2$ is deposited predominantly along the top of the windshield to create a sunshade.

To defrost or increase the fading rate of the windshield, switch 33 is opened and switch 34 is closed. An A.C. current is then applied between bus bars 38 and 39, which heats the window.

A window unit such as that disclosed in Example I can be also connected in an electrical circuit which incorporates a photoelectric cell, as shown in FIGURE 5, to permit automatic control of the window's transmittance.

In FIGURE 5, the window is indicated as 55, the D.C. power supply (battery) as 56, and the photoelectric-cell-operated switching mechanism as 57. Automatic darkening and fading of the window is accomplished by the photoelectric cell detecting and measuring the amount of visible radiation and, in response thereto, opening and closing the circuit which operates the window.

Various alternative compositions can be utilized in fabricating the various elements of the variable transmission windows of the present invention. The composition of the glass sheets in the double glazed unit, for example, is not critical. Almost all of the ordinary commercially available glass compositions are suitable, including, but not limited to, the soda-lime-silica compositions used to fabricate plate and window glass articles. The only essential characteristics for the glass sheet composition are that the glass be essentially transparent to visible light and not electrically conductive.

Although the electrically conductive coating preferred in the present invention is tin oxide, other electrically conductive coatings, such as vacuum deposited metallic gold, can also be utilized. The only essential characteristics for the coating are that the coating be relatively stable, essentially transparent and capable of conducting the required amount of electrical energy.

The family of interlayer materials of the present invention is defined by the following ranges of the ingredients indicated in Table I below.

TABLE I

| Ingredient: | Parts by wt. |
| --- | --- |
| Polyethylene glycol (molecular weight 200) | 15–45 |
| Lead acetate | 2–25 |
| Polyvinyl butyral | 35–70 |
| Hydroquinone | 0.05–0.5 |

Various alternative materials can also be used in compounding the interlayer material of the present invention. The polyethylene glycol can be replaced in whole or in part, for example, by carbitol, Cellosolve or tetrahydrofurfuryl alcohol. Among the other possible sources of lead are lead benzoate, lead caprylate and lead butyrate.

The unit of Example I can be operated using direct current voltages from 4 volts to 150 volts. As the operating voltage is increased, however, the temperature of the window may increase to an objectionable level. It is contemplated that voltages between about 8 and 20 volts will be the most commonly used to operate the windows of the present invention. It should be noted that the higher the temperature of the window, the more rapid is the rate of dissolution of the precipitated $PbO_2$ or $Tl_2O_3$ in the interlayer material.

The window shown in Example I can be operated from 0.3 to 10.0 milliamps per square inch of electrically conductive coating, but the preferred amperage range is between about 0.7 and 2 milliamps per square inch.

It should be noted that the electrical resistance of conductive coatings having a uniform composition and thickness is commonly defined in units of ohms per square. This means of measuring the electrical resistance of conductive coatings has been adopted because similarly shaped electrically conductive coating areas exhibit the same electrical resistance regardless of the difference in size of the areas compared.

For example, a square shaped conductive coating exhibits the same electrical resistance between opposite edges whether the area of the square is one square inch, one square foot or one square yard. Furthermore, if the square conductive coated test area is expanded into a rectangular-shaped area twice as long as its original length but of original width, the resistance measured between the short sides of the rectangular area will be twice the original resistance measured for the original square area. If this rectangular area's resistance is measured between its long sides, the resistance determined will be one-half of the resistance measured for the original square area.

In the present invention, it is contemplated that the principal sheets of the double glazed unit, 2 and 3 of FIGURE 1, will range in size from about a 4 inch square up to about a 6 foot square; however, larger or smaller units can also be fabricated. The preferred thicknesses of the glass sheets also varies from as thin as ⅛ of an inch up to ½ of an inch, but, again, both thicker and thinner glass sheets can be used.

The thickness of the interlayer can vary from 0.020 inch up to 0.250 inch, but the preferred range of interlayer thicknesses is between about 0.04 and 0.10 inch. Interlayer thicknesses greater than about 0.25 inch require excessively high D.C. voltages.

The thickness of the electrically conducting coatings in the present invention applied to the inner surface of each of the two major glass sheets of the window unit is not critical. When tin oxide is used as the conductive coating, however, it should be between about $1.0 \times 10^{-6}$ and $2.0 \times 10^{-4}$ inch thick. Electrically conductive coating thicknesses greater than about $2.0 \times 10^{-4}$ inch are simply unnecessary and waste material. Thicker coatings also tend to impair the transparency of the window.

In the window of Example I, the electrically conductive coating on sheet 2 is the anode and the coating on sheet 3 the cathode. In operating this unit, Pb(II) from the interlayer material is deposited on the anode as $PbO_2$ and, to a limited extent, metallic lead is deposited on the cathode. The small amount of metallic lead which deposits on the cathode coating is not objectionable since it is also opaque and thus helps decrease the light transmission of the window. The metallic lead deposit is also soluble in the interlayer material to permit fading of the window.

In the operation of the windows of the present invention, the deposition of $PbO_2$ on the anode surface begins as soon as the D.C. current is applied. As soon as a small amount of $PbO_2$ is deposited, hydroquinone from the interlayer, as well as certain unidentified impurities, begin to redissolve the $PbO_2$. The rate of $PbO_2$ deposition, however, is faster than the rate of $PbO_2$ dissolution as long as the current is on, and the net result of the competing processes is a build-up of $PbO_2$ which darkens the window. When the current is turned off, no further $PbO_2$ deposition occurs, and the hydroquinone from the interlayer material continues to dissolve the $PbO_2$ precipitate to restore the transmission of the window. The darkening of the window in the present invention then is the result of two competing reactions, deposition and dissolution, and the fading is only the result of the dissolution reaction.

The variable transmission windows of the present invention operate best between temperatures of 10° F. and 120° F. but can be operated at both higher and lower temperatures. The dissolution rate of $PbO_2$ in hydroquinone is temperature-dependent, that is, the higher the temperature the faster the window is observed to fade. The rate of electrical deposition of $PbO_2$ is fairly constant, however, over a wide range of temperatures for any particular current.

It is also possible to utilize, in lieu of the plastic polyvinyl butyral type of interlayer material in the present invention, a liquid interlayer medium. Suitable liquid systems can be made by dissolving lead acetate in polyethylene glycol, cellosolve, tetrahydrofurfuryl alcohol or other numerous solvents or mixtures thereof. The solution may then be poured into the space separating the glass sheets which is normally occupied by the interlayer material and the unit operated in the same manner as the resin type interlayer windows. Hydroquinone may also be added to the liquid interlayer material to enhance the rate of fading. A liquid cell type of window unit is not preferred, however, due to the problems created by hydraulic forces and failure of sealants in the unit. Temperature changes could also cause problems by creating changes in the internal pressure of the unit. A liquid interlayer also does not enhance the strength of the double glazed unit, whereas a plastic interlayer does.

Lead is the preferred metal in the present invention, although thallium may also be used. Whichever of these two metals is used, it should be present in the interlayer in a concentration of at least 1.0 percent by weight. The deposition of thallium oxide is not as rapid nor is the deposited thallium oxide precipitate as soluble in the interlayer material as $PbO_2$. Thallium is also considerably more expensive than lead. Mixtures of thallium and lead may be used but do not represent any advantage over the use of pure lead.

While the invention has been described in terms of specific examples, the scope of the invention should only be limited by the language of the appended claims.

I claim:

1. A laminated glass article suitable for use as a viewing medium, which comprises at least two glass sheets each coated on at least a portion of one major surface with a thin, essentially transparent, electronically-conductive coating, an ionically conductive interlayer material positioned between said glass sheets and in contact with the electronically-conductive coating of each glass sheet, said interlayer material incorporating polyvinyl butyral, an organic alcohol selected from the class consisting of carbitol, Cellosolve, tetrahydrofurfuryl alcohol and polyethylene glycol, an effective amount of hydroquinone and a compound of a metal selected from the group consisting of lead and thallium soluble in said interlayer to provide at least 1.0 percent by weight of said metal, and means to establish a difference in electrical potential across the interlayer material between the electronically conductive coating on each glass sheet whereby a coating of $PbO_2$ or $Tl_2O_3$ is deposited on one of said electronically conductive coatings.

2. A laminated glass article according to claim 1, in which the electronically conducting coating on at least a portion of each glass sheet is tin oxide.

3. A laminated glass article according to claim 1, in which the ionically conductive interlayer material consists essentially of the following ingredients in parts by weight: polyethylene glycol 15.0 to 45.0 parts, hydroquinone 0.05 to 0.5 parts, polyvinyl butyral 35.0 to 70.0 parts, and a metallic compound whose metal constituent is selected from the group consisting of lead and thallium, 2.0 to 25.0 parts.

4. A laminated glass article according to claim 1, in which the ionically conductive interlayer material consists essentially of the following ingredients, in parts by weight: polyethylene glycol 30.0 parts, hydroquinone 0.10 part, polyvinyl butyral 50.0 parts, and lead acetate 20.0 parts.

5. A laminated glass article according to claim 1, in which the means to establish a difference in electrical potential across the interlayer material comprises at least two bus bars and a direct current power source, in which at least one bus bar is connected to each of the electronically conductive coatings of the laminated glass article.

6. A laminated glass article according to claim 1, in which the means to establish a difference in electrical potential across the interlayer material comprises at least three bus bars, a direct current power source and an alternating current power source to which two of the bus bars are connected on opposite ends of one of the electronically conductive coatings and one of the bus bars is connected to the remaining electrically conductive coating of the laminated glass article.

References Cited

UNITED STATES PATENTS

| | | | |
|---|---|---|---|
| 2,944,926 | 7/1960 | Gaiser | 161—196 |
| 3,153,113 | 10/1964 | Flanagan et al. | 88—61 |
| 3,196,743 | 7/1965 | Dreyer | 350—160 |

RONALD L. WIBERT, Primary Examiner

P. K. GODWIN, Assistant Examiner

U.S. Cl. X.R.

350—276